(No Model.)
J. H. WILSON & C. E. ZEIGLER.
COOKING VESSEL.
No. 538,141. Patented Apr. 23, 1895.
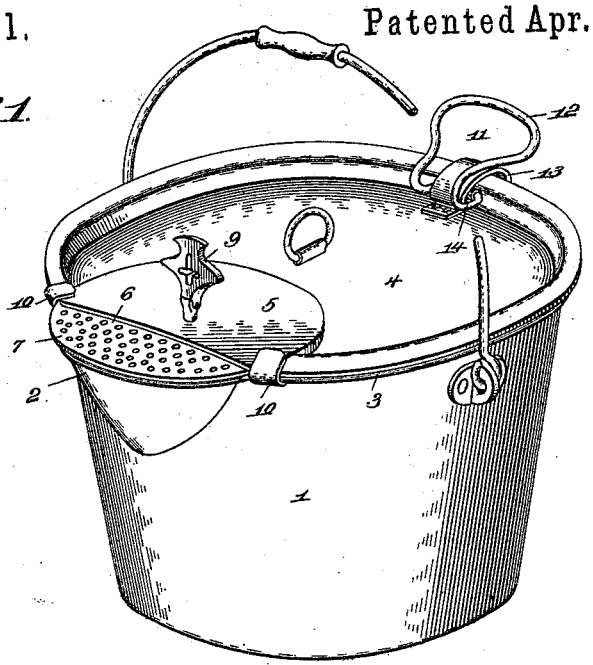
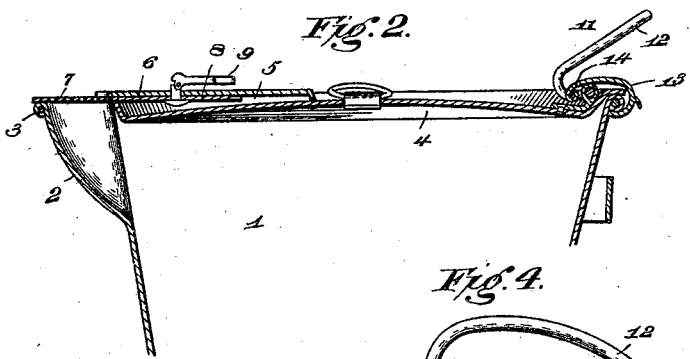
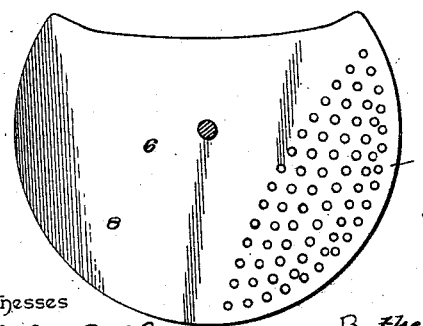
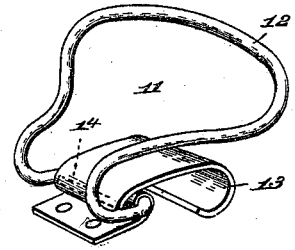
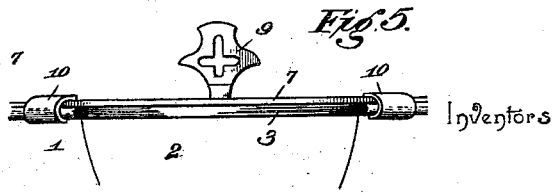
Witnesses
Inventors
John H. Wilson and
Charles E. Zeigler,
By their Attorneys,

UNITED STATES PATENT OFFICE.

JOHN H. WILSON AND CHARLES E. ZEIGLER, OF CARLISLE, PENNSYLVANIA, ASSIGNORS OF ONE-THIRD TO MILTON I. ZEIGLER, OF SAME PLACE.

COOKING-VESSEL.

SPECIFICATION forming part of Letters Patent No. 538,141, dated April 23, 1895.

Application filed February 23, 1895. Serial No. 539,398. (No model.)

*To all whom it may concern:*

Be it known that we, JOHN H. WILSON and CHARLES E. ZEIGLER, citizens of the United States, residing at Carlisle, in the county of Cumberland and State of Pennsylvania, have invented a new and useful Cooking-Vessel, of which the following is a specification.

The invention relates to improvements in cooking vessels.

The object of the present invention is to improve the construction of cooking vessels, and to provide a cover adapted to be applied to any ordinary pot or kettle, or similar vessel, having a lip or spout, and capable of entirely closing the spout or lip, to confine the steam within the vessel, and adapted to arrange a strainer over the same, and also to free the spout or lip, to enable the contents of the vessel, whether liquid or solid, to be readily poured from it.

Another object of the invention is to provide simple and efficient devices for detachably securing the lid to the body of a vessel, and of preventing the lid from accidentally rotating on the same.

The invention consists in the construction and novel combination and arrangement of parts hereinafter fully described, illustrated in the accompanying drawings, and pointed out in the claims hereto appended.

In the drawings: Figure 1 is a perspective view of a cooking vessel provided with a lid constructed in accordance with this invention. Fig. 2 is a transverse sectional view of the upper portion of the same. Fig. 3 is a detail view of the rotary plate. Fig. 4 is a detail perspective view of the locking device. Fig. 5 is a detail view.

Like numerals of reference indicate corresponding parts in all the figures of the drawings.

1 designates a cooking vessel, which is provided with a lip or spout 2, and which may be an ordinary pot or kettle, steamer, or any other culinary receptacle; and arranged on the vessel, which is provided at its top with a bead 3, is a removable cover 4. The removable cover 4 is provided adjacent to the spout or lip with a flat pocket 5, open at the periphery of the cover, and receiving a rotary plate 6, having a foraminous portion 7, adapted to extend over the spout or lip, to provide a strainer. The rotary plate is substantially segmental, and is provided with a solid imperforate portion 8, adapted to cover the top of the spout or lip, to confine the steam within the vessel, and the said rotary plate is adapted to be entirely or substantially concealed within the pocket 5, to clear or free the mouth of the spout or lip to permit the contents of the vessel, whether liquid or solid to be readily poured from it.

The pocket or recess for the reception of rotary plate 6 may be stamped or otherwise formed, and plate 6 pivoted to its lower surface, but is preferably constructed by securing a flat plate to the upper surface of the cover, and by recessing the periphery of the same, and this construction does not interfere with the depression of the central portion of the cover, or that portion within the rim to form the ordinary inwardly inclined dripping shoulder or surface, and the plate does not materially project above the upper surface of the rim of the cover. The rotary plate is pivotally mounted by means of a suitable handle 9, which is adapted to fold flat upon the upper face of the pocket, to enable the covers to be compactly arranged for storing or shipment.

In order to secure the cover rigidly on the body of the vessel, to prevent the cover from accidentally turning or becoming displaced, and carrying the rotary plate and pocket out of its proper position relative to the lip or spout, depending hooks 10 are rigidly mounted on the cover at opposite sides of the spout or lip, and removably engage under the bead 3 of the vessel. The depending rigid hooks are located at opposite sides of the spout or lip, and thereby prevent the cover from rotating.

The cover is detachably secured at the back of the vessel by a locking device 11, comprising a handle or bail 12, hingedly connected with the cover, and having its lower or hinged portion inwardly offset or bent, and a hook 13 hingedly connected with the offset or bent portion of the handle or bail, and thereby eccentrically connected with the same. The hook has its outer portion curved downwardly or bent, and adapted to engage the bead 3 of the body of the vessel.

The hook may be constructed of any suitable material, but preferably consists of a casting, and is provided at its inner end with an eye for the reception of a cross-piece, or pintle 14, eccentrically mounted on the bail or handle.

The hook 13, which may be provided with a finger piece, if desired, is engaged with the bead, when the handle or bail is swung downward or outward, and the upward swinging of the bail or handle carries the link 13 forward and inward, into engagement with the bead of the body of the vessel. When the bail or handle has been swung inward over the cover it forms a lock, for the hook, and also serves as a handle to assist in tilting the vessel for pouring, the vessel being provided with a swinging bail to permit it to be carried. The finger piece on the hook permits it to be readily disengaged from the bead, when the handle or bail is swung down, and when it is desired to remove the cover from the vessel.

It will be seen that the cover is simple and inexpensive in construction, that it possesses great strength and durability, that it is adapted to be readily applied to all kinds of cooking vessels, and that it is capable of closing the lip or spout to confine the steam, of arranging a perforated or foraminous portion of the rotary plate over the spout or lip, to provide a strainer and of entirely freeing the spout or lip when it is desirable.

Changes in the form, proportion, and the minor details of construction may be resorted to without departing from the principle or sacrificing any of the advantages of this invention.

What we claim is—

1. The combination with a vessel provided with a lip or spout, of a cover provided adjacent to the lip or spout with a pocket open at the periphery of the cover, and a segmental plate pivoted in the pocket and adapted to be rotated and provided with a foraminous portion, and having an imperforate or solid portion, and adapted to be arranged with either portion covering the lip or spout or to be arranged within the pocket to free or clear the lip or spout, substantially as described.

2. The combination with a vessel provided with a lip or spout, of a cover provided with a pivotally mounted segmental plate arranged adjacent to the lip or spout, and having a foraminous and a solid portion, and adapted to be arranged with its foraminous portion over the spout or lip to form a strainer, or with its solid portion over the same to confine the steam or to clear or free the mouth or lip, substantially as described.

3. The combination with a vessel provided with a lip or spout, of a cover provided adjacent to the lip or spout with a recess, and having a plate secured to it adjacent to the recess and forming a flat pocket, and a plate pivotally mounted in the pocket and having a foraminous portion, substantially as described.

4. The combination with a vessel provided with a lip or spout and having a bead at its upper edge, of a cover provided adjacent to the lip or spout with a pocket, a rotary plate arranged in the pocket and adapted to extend over the spout and having a perforated portion, hooks depending from the cover and rigidly secured to the same and located at opposite sides of the pocket and arranged to engage under the bead of the vessel, and a locking device mounted on the opposite side of the cover for engaging the vessel, substantially as described.

5. The combination with a vessel provided with a bead, of a cover, a bail hingedly mounted on the cover, adjacent to one edge thereof, and a hook eccentrically connected at its inner end to the bail and arranged to engage the bead, said bail when swung inward to lock the hook in engagement with the body of the vessel being arranged to form a handle, substantially as described.

6. The combination with a cover, a bail hingedly mounted on the cover adjacent to one edge thereof, and a hook eccentrically connected at its inner end to the bail and arranged to engage the top edge of the vessel on which the cover is placed, said bail when swung inward to lock the hook in engagement with the body of the vessel being disposed above the same to form a handle therefor, substantially as described.

In testimony that we claim the foregoing as our own we have hereto affixed our signatures in the presence of two witnesses.

JOHN H. WILSON.
CHAS. E. ZEIGLER.

Witnesses:
ARTHUR R. RUPLEY,
EDWARD M. HIMES.